United States Patent
Quitter

(10) Patent No.: US 9,248,605 B2
(45) Date of Patent: Feb. 2, 2016

(54) CURED-IN PLACE LINER MATERIAL AND METHODS AND SYSTEMS FOR MANUFACTURE

(71) Applicant: Rene Quitter, San Diego, CA (US)

(72) Inventor: Rene Quitter, San Diego, CA (US)

(73) Assignee: Monte Vista Group LLC, La Jolla, CA (US)

( * ) Notice: Subject to any disclaimer, the term of this patent is extended or adjusted under 35 U.S.C. 154(b) by 43 days.

(21) Appl. No.: 14/077,860

(22) Filed: Nov. 12, 2013

(65) Prior Publication Data

US 2014/0166185 A1    Jun. 19, 2014

Related U.S. Application Data

(63) Continuation of application No. 12/505,050, filed on Jul. 17, 2009, now Pat. No. 8,580,364.

(60) Provisional application No. 61/098,326, filed on Sep. 19, 2008.

(51) Int. Cl.
*F16L 55/162* (2006.01)
*B29C 63/26* (2006.01)
(Continued)

(52) U.S. Cl.
CPC . *B29C 63/26* (2013.01); *B32B 1/08* (2013.01); *B32B 5/02* (2013.01); *B32B 5/024* (2013.01); *B32B 5/04* (2013.01); *B32B 5/06* (2013.01); *B32B 5/12* (2013.01); *B32B 5/22* (2013.01); *B32B 5/26* (2013.01); *B32B 7/12* (2013.01); *B32B 25/10* (2013.01); *B32B 27/12* (2013.01); *B32B 27/283* (2013.01); *B32B 27/34* (2013.01); *B32B 27/36* (2013.01); *F16L 55/165* (2013.01); *F16L 55/1656* (2013.01); *B29L 2023/006* (2013.01); *B32B 2255/02* (2013.01); *B32B 2255/10* (2013.01); *B32B 2255/26* (2013.01); *B32B 2260/021* (2013.01); *B32B 2260/046* (2013.01); *B32B 2262/0261* (2013.01); *B32B 2262/0276* (2013.01); *B32B 2262/101* (2013.01);
(Continued)

(58) Field of Classification Search
None
See application file for complete search history.

(56) References Cited

U.S. PATENT DOCUMENTS 3,927,695 A    12/1975    Crockwell
5,264,981 A    11/1993    Campbell et al.
(Continued)

FOREIGN PATENT DOCUMENTS

DE    4427633    2/1995
DE    4445166    6/1996
(Continued)

*Primary Examiner* — Barbara J Musser
(74) *Attorney, Agent, or Firm* — Lewis Kohn & Walker LLP; David M. Kohn; Kari Moyer-Henry

(57) ABSTRACT

A liner tube for repairing existing pipes is provided. The liner tube is sufficiently flexible to lie substantially flat under its own weight thereby defining an upper portion and a lower portion. The liner tube includes an inner layer, an outer layer disposed around the inner layer, a first intermediate layer disposed between the inner layer and the outer layer, the first intermediate layer being wrapped around the inner layer to overlap itself and define a first overlap portion in the upper portion, and a second intermediate layer disposed between the first intermediate layer and the outer layer, the second intermediate layer being wrapped around the first intermediate layer to overlap itself and define a second overlap portion in the lower portion. The first and second intermediate layers include a porous material and the inner layer includes material substantially impermeable to liquids.

5 Claims, 19 Drawing Sheets

(51) Int. Cl.
- *F16L 55/165* (2006.01)
- *B32B 1/08* (2006.01)
- *B32B 5/04* (2006.01)
- *B32B 5/12* (2006.01)
- *B32B 5/26* (2006.01)
- *B32B 27/12* (2006.01)
- *B32B 5/02* (2006.01)
- *B32B 5/06* (2006.01)
- *B32B 5/22* (2006.01)
- *B32B 7/12* (2006.01)
- *B32B 25/10* (2006.01)
- *B32B 27/28* (2006.01)
- *B32B 27/34* (2006.01)
- *B32B 27/36* (2006.01)
- *B29L 23/00* (2006.01)

(52) U.S. Cl.
CPC ....... *B32B 2262/106* (2013.01); *B32B 2262/14* (2013.01); *B32B 2307/40* (2013.01); *B32B 2307/50* (2013.01); *B32B 2307/546* (2013.01); *B32B 2307/7242* (2013.01); *B32B 2307/7265* (2013.01); *B32B 2597/00* (2013.01); *Y10T 29/49838* (2015.01); *Y10T 29/53696* (2015.01); *Y10T 156/1038* (2015.01); *Y10T 428/1334* (2015.01); *Y10T 428/1393* (2015.01)

(56) References Cited

U.S. PATENT DOCUMENTS

| | | |
|---|---|---|
| 5,944,058 A | 8/1999 | Kamiyama et al. |
| 6,158,476 A | 12/2000 | Sjotun |
| 6,196,271 B1 | 3/2001 | Braun et al. |
| 6,276,398 B1 * | 8/2001 | Lange .............. 138/98 |
| 6,708,729 B1 | 3/2004 | Smith |
| 6,923,217 B2 | 8/2005 | Smith |
| 7,018,691 B2 | 3/2006 | McNeil |
| 7,114,751 B2 | 10/2006 | Reynolds |
| 7,849,883 B2 | 12/2010 | Manners |
| 2003/0173774 A1 | 9/2003 | Reynolds |
| 2005/0118383 A1 | 6/2005 | Cargill |
| 2009/0194183 A1 * | 8/2009 | Kiest, Jr. ............ 138/98 |
| 2010/0075075 A1 | 3/2010 | Takahashi |
| 2010/0075078 A1 | 3/2010 | Quitter |
| 2012/0145271 A1 | 6/2012 | McKeller et al. |

FOREIGN PATENT DOCUMENTS

| | | |
|---|---|---|
| DE | 19900229 | 7/2000 |
| DE | 10100258 | 7/2002 |
| DE | 10221550 | 4/2004 |
| DE | 102006008379 | 8/2007 |
| FR | 2628507 | 9/1989 |
| WO | 02087045 | 10/2002 |
| WO | 03038330 | 5/2003 |
| WO | WO 2008152370 A2 * | 12/2008 |

* cited by examiner

CURED-IN PLACE LINER MATERIAL AND METHODS AND SYSTEMS FOR MANUFACTURE

CROSS-REFERENCES TO RELATED APPLICATIONS

This application is a continuation of U.S. application Ser. No. 12/505,050, filed Jul. 17, 2009, now issued U.S. Pat. No. 8,580,364, which claims the benefit of U.S. Provisional Patent Application No. 61/098,326 filed on Sep. 19, 2008, which is incorporated by reference in its entirety for all purposes.

BACKGROUND

1. Field of the Invention

The present invention relates generally to tube liners for pipes and systems and methods for the manufacture of tube liners, and more particularly to cured-in-place tube liners.

2. Description of the Related Art

Much of the infrastructure in cities around the world was installed many years ago, and is now beginning to age and decay. For example, aging pipes for sewers, storm drains, water, gas, oil, etc. begin to leak due to cracks/damage in the walls of the pipes and in connection between pipe segments. Where the pipe is carrying sewage or other hazardous materials, it is unacceptable to allow leaks into the environment. Thus, a significant task for local, state and national governments around the world is to replace damaged pipelines with new ones.

However, as most pipes are underground, it is extremely expensive and time consuming to replace pipes. The earth around the damaged pipe must be excavated, and the damaged pipe must be removed from the ground. The new pipe segment must then be placed in the excavation site, joined and sealed to adjacent pipe segments, and then buried again. All of these tasks are very time consuming and require heavy machinery and many workers, thus making the replacement process very expensive.

As an alternative to excavating the damaged pipe, it is possible replace/repair the pipe from the inside out using a curable fabric liner. The liner, typically fiberglass or felt, is impregnated with a curable resin and then inserted or inverted (i.e. turned inside-out) into the damaged pipe. By using a fluid medium under pressure (e.g. gases or liquids, including air or water), the liner is pressed against the inner walls of the existing damaged pipe. Once the resin cures (due to a catalyst of heat, light, or chemical), the liner is rigid and the pressure source can be removed, leaving a new gas/liquid-tight inner wall of the damaged pipe.

SUMMARY

A liner tube in accordance with the disclosure has sufficient flexibility to lie substantially flat in a first state and to be substantially circular in cross section in an expanded state. The liner tube includes an inner layer, an outer layer disposed around the inner layer, a first intermediate layer disposed between the inner layer and the outer layer, the first intermediate layer being wrapped around the inner layer to overlap itself and define a first overlap portion in a first circumferential position of the circular cross section when the liner tube is in the expanded state, and a second intermediate layer disposed between the first intermediate layer and the outer layer, the second intermediate layer being wrapped around the first intermediate layer to overlap itself and define a second overlap portion in a second circumferential position of the circular cross section when the liner tube is in the expanded state, the first circumferential position and the second circumferential position being at least 120 degrees apart circumferentially, where the first and second intermediate layers include porous material and the inner layer includes material substantially impermeable to liquids.

A method and apparatus for inserting a line within a spool of flexible tubing to be used as an innermost layer of the liner tube are disclosed. The method includes supporting a first spool wound with flexible tubing on a support such that the flexible tubing can be unwound, inserting a line spool wound with line within an open end of the flexible tubing while retaining an end of the line with an end of the flexible tubing, stringing the flexible tubing and the line over a transition member such that the line spool remains in a portion of the flexible tubing between the first spool and the transition member, the transition member being positioned above the first spool, and winding the flexible tubing and the line around a second spool such that the flexible tubing is unwound from the first spool and the line is unwound from the line spool.

A method and apparatus for assembling a liner tube are disclosed. The apparatus includes a frame, a plurality of rotation members coupled to the frame to receive spools containing wound layers of material, the rotation members being configured and disposed such that the wound layers of material can be unwound parallel to each other. A tubing rotation member of the plurality of rotation members is configured to receive a spool of flexible tubing, first and second rotation members of the plurality of rotation members are configured to receive respective first and second spools of absorbent material, and an outer layer rotation member is configured to receive a spool of an outer layer material. A first receiver platform is coupled to the frame and is configured and disposed to receive the flexible tubing and the first absorbent material from the first spool and position the flexible tubing in a substantially flat state against the first absorbent material. A folder mechanism is coupled to the first receiver platform and is configured to fold the first absorbent material around the flexible tubing such that the first absorbent material overlaps with itself along a longitudinal edge to define a first overlap portion on a first surface of the flexible tubing. A second receiver platform is configured and disposed to receive the folded first absorbent material and the flexible tubing, the second absorbent material and the outer layer material, and position the folded first absorbent material and the flexible tubing against at least one of the second absorbent material and the outer layer material. The folded first absorbent material and the flexible tubing, the second absorbent material and the outer layer material are disposed on the second receiver platform such that the second absorbent layer is positioned to be wrapped around the first absorbent material to overlap itself to define a second overlap portion on a second surface of the folded first absorbent material and the flexible tubing, the second surface being opposite the first surface, and the outer layer material is positioned to be wrapped around the second absorbent material to surround the first and second absorbent layers between the flexible tubing and the outer layer material.

A method and apparatus for impregnating a liner tube with a curable liquid are disclosed. The apparatus includes an inclined conveyor belt having a low end and an elevated end, the conveyor belt configured to receive a liner tube at the low end of the conveyor belt and propel the liner tube toward the elevated end, wherein the liner tube is a substantially flat flexible tube comprising an outer layer, an inner layer, and a plurality of intermediate layers, the intermediate layers comprising absorbent material. The apparatus further includes an applicator coupled to a liquid source containing a curable liquid, the applicator being configured to drive the curable liquid through at least one aperture formed in the outer layer into the intermediate layers to impregnate the absorbent material, and at least one roller configured to compress the liner tube while the conveyor belt propels the liner tube, subsequent to the curable liquid being driven into the intermediate layers, to distribute the curable liquid along a length of the liner tube.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The invention is now described, by way of a non-limiting example, with reference to the accompanying drawings, in which:

FIG. 5A shows a right-side view, FIG. 5B shows an upper-front-left view, FIG. 5C shows a lower-front-left view, FIG. 5D shows a view of a first receiver platform receiving layers of the liner tube, FIG. 5E shows a right-rear view, FIG. 5F shows a view of a second receiver platform for receiving layers of the liner tube and FIG. 5G shows a view of an apparatus for conveying the liner tube through the folding apparatus.

DETAILED DESCRIPTION

Figure 1A:
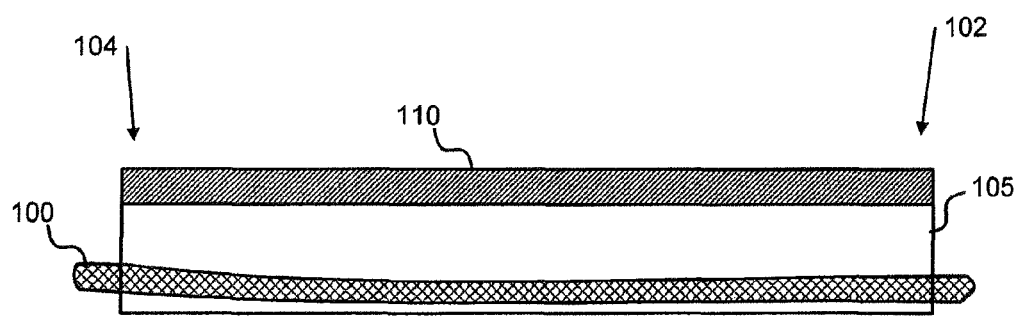
FIGS. 1A and 1B are schematic illustrations of an example of a liner tube located within a pipe in an uninstalled stated and in an installed state, respectively.

An example of a liner tube in accordance with the disclosure is constructed of material sufficiently flexible to lie substantially flat to define an upper portion and a lower portion. The liner tube, when manufactured, is in the flat state and, upon being located in a pipe to be repaired, is deployed into an expanded state. The liner tube includes inner and outer impermeable layers, also referred to as film layers or foil layers. The inner and outer impermeable layers may be made of a plastic material. Between the inner and outer layers are multiple intermediate layers of porous, fibrous and/or woven materials such as fiberglass, felt, polyamide materials, carbon fiber, or any combination thereof. The various layers comprising the liner tube are of material that is substantially flat and elongated.

The intermediate layers can be generally rectangular strips with opposed longitudinal edges. During manufacturing, each strip is folded over itself along its length to form a substantially flat overlaid structure with the opposed longitudinal edges overlapping a portion of each other to define overlap portions. The first intermediate layer is disposed around the impermeable inner layer. The second intermediate layer surrounds the first intermediate layer. Each succeeding intermediate layer is wrapped around the previously wrapped intermediate layer to essentially form a series of nested folds. As described further below, at installation of the liner tube, the nested folds of material are inflated to form concentric layers of the liner tube. The intermediate layers are arranged such that, in the flat state, at least one of the overlapping portions of one intermediate layer is located on the opposite side of the liner tube from the overlapping portions of one of the other intermediate layers. The overlapping portions are arranged such that no two adjacent intermediate layers have overlapping portions that are aligned with each other. For example, after the edges of a first intermediate layer are overlapped along a lower portion of the first intermediate layer, a second intermediate layer may be wrapped around the first intermediate layer such that the overlap of the second intermediate layer is located on the upper portion of the second intermediate layer, opposite the overlap of the first intermediate layer. An assembler apparatus in accordance with the disclosure can be used to perform the folding operation to fabricate the liner tube having these features.

In one aspect, during production of the liner tube, resin is injected between the inner and outer layers and spread across the length of the insertion tube until the intermediate layers are fully wetted, to impregnate the intermediate layers with resin. The resin may be polyester resin, epoxy resin, or any other type of resin. Magnesium oxide may be mixed into the resin as a thickening agent. As known to those skilled in the art, the magnesium oxide initially has no effect on the resin, but over time will eventually thicken the mixture. In this way, the resin mixture can be easily spread throughout the intermediate layers, thereby facilitating the resin to be impregnated into the intermediate layers and later, upon thickening, will not migrate or pool within the intermediate layers. The resin may be spread by rollers, squeegee, or the like so as to provide a continuous, uniform distribution throughout the intermediate layers. The resin is curable by heat, light, or chemical catalyst. If light is the catalyst, then the outer layer can be impermeable to light at least in the spectrum that catalyzes the reaction, for example it can be made impermeable to 360-420 nm wavelength light in the ultraviolet (UV) spectrum. An impregnator apparatus in accordance with the disclosure can be used to impregnate a liner tube with the resin or any other liquid.

The inner layer of the liner tube can be constructed of flexible tubing (seamless or seamed). The inner layer can include an inner-most silicone coating on the innermost intermediate layer. Alternatively, the inner layer can be constructed of a polyester fleece with a silicone coating. A polyamide film can optionally be formed between the polyester fleece and the silicone coating.

In some embodiments, the inner layer of the liner tube includes a line or string within the inner layer along the entire length of the liner tube. As described further below, the string can assist with deployment of a curing source within the liner tube while installing the liner tube within a pipe. A stringer apparatus in accordance with the disclosure can be used to quickly insert the line into the entire length of a wound spool of the inner layer.

In FIG. 1A, a liner tube 100 in accordance with the disclosure is shown in an uninstalled flat state, placed within a pipe 105. The pipe may be located, for example, buried within ground, or placed underwater, or encased in cement, or the like. Thus, the pipe 105 is typically covered by an upper surface material 110 such as earth, cement, water, or the like.

For deployment and installation, the liner tube 100 can be inserted at one end 102 of the pipe 105 (e.g., via a manhole cover access point, not shown). The liner tube is initially inserted into the pipe in a folded or bundled state. A self-propelled robot (not shown) can be used to pull a rope or cable through the pipe from the second end 104 of the pipe, displaced from the folded liner tube, toward the first end 102, at which the liner tube has been placed. When the rope/cable has been pulled through the pipe by the robot to reach the liner tube 100, the rope/cable can be clamped to an end of the liner tube and then pulled back toward the second end 104, taking the liner tube with it. The cable and clamped liner tube may be pulled back toward the second end 104 via a winch, for example, being pulled along the entire length of the pipe.

Figure 1B:
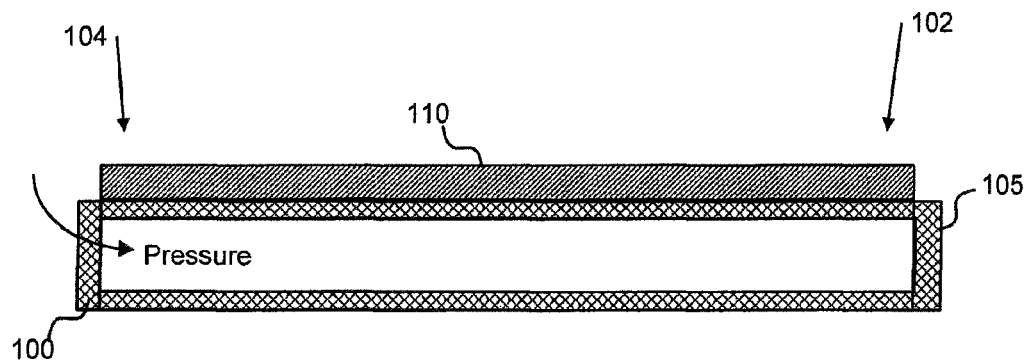

After the liner tube 100 has been pulled through the pipe and into position at the second end 104, one end of the liner tube is plugged or clamped shut to make a seal that is air-tight and water-tight. At the other end of the liner tube 100, air, gas, or liquid is forced into the liner tube to inflate the liner tube, as illustrated in FIG. 1B. The air, gas, or liquid can be forced into the liner tube by forcing air, water, or some other gas/liquid into the liner tube 100. A pressure in the range of about six psi to about ten psi is typically sufficient to expand the liner tube 100.

The liner tube 100 can experience very large axial and tension forces when being pulled into the pipe 105 by the cable. Liner tubes in accordance with the invention can include at least one layer capable of handling these large forces such that the liner tube does not stretch or deform by an amount that damages the liner tube. This can be accomplished by having at least one layer of the liner tube that includes a high percentage of axially aligned fibers.

In accordance with the disclosure, some liner tubes include layers that are able to expand somewhat when under pressure. In this way, when inflated, the liner tube can expand and fill in any gaps between the liner tube 100 and the innermost wall of the pipe 105. This can provide a more secure fit within the pipe so that the expanded liner tube conforms to the inner surface shape of the pipe.

Once the liner tube 100 is inflated into the expanded state, a curing apparatus is introduced into the interior of the liner tube in order to cure the resin mixture contained in the intermediate layers of the liner tube. The curing apparatus may be a heat source, a UV light source, steam, hot water, or the like. Curing the resin hardens the resins, and the liner tube 100 thereafter remains in the expanded state, as illustrated in FIG. 1B. The inner and outer layers of the liner tube are impermeable to the resin contained in the intermediate layers such that the resins do not leak out but remain contained between the inner and outer layers. The innermost layer of the liner tube can remain in place after curing or can be removed after curing, depending on the construction of the innermost layer and the type of layer material and/or the type of pipe 105 that is being lined.

In some embodiments, the liner tube 100 is cured with UV light. In that case, a UV light source (e.g., a light train having multiple point sources or lamps emitting UV light) is introduced into the liner at one end and pulled through the liner tube toward the opposite end. In these embodiments, the liner tube can be manufactured with a line or string contained in the inner most tubular layer to assist with pulling the UV light source. A rope is tied to the inner layer string located at one end of the pipe and the string is pulled through the entire length of the pipe being repaired, taking the rope with it. The UV light source is then attached to the rope and the rope is pulled through the length of the pipe, taking the UV light source with it. In this way, the UV light source cures the resin and thereby affixes the liner tube in the rigid, expanded state as shown in FIG. 1B. Other techniques for curing the liner tube will be known to those skilled in the art. Methods and apparatus for inserting the string inside the innermost layer of the liner tube 100 will be discussed further below in connection with FIGS. 6 and 7.

Figure 2A:
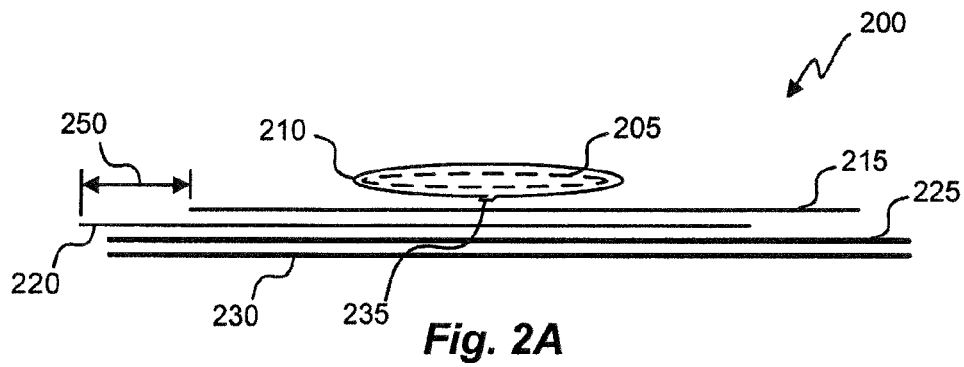
FIGS. 2A, 2B, and 2C show cross sections of an example of a liner tube in a partially fabricated state, in an uninstalled flat state and in an expanded state, respectively.
Figure 2B:
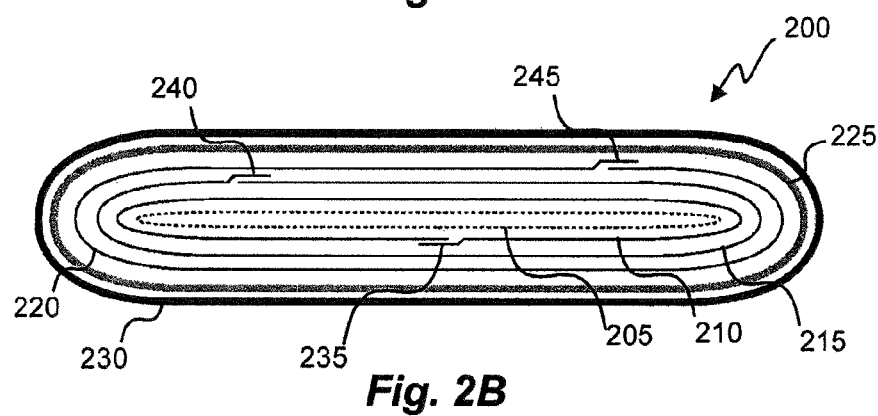
Figure 2C:
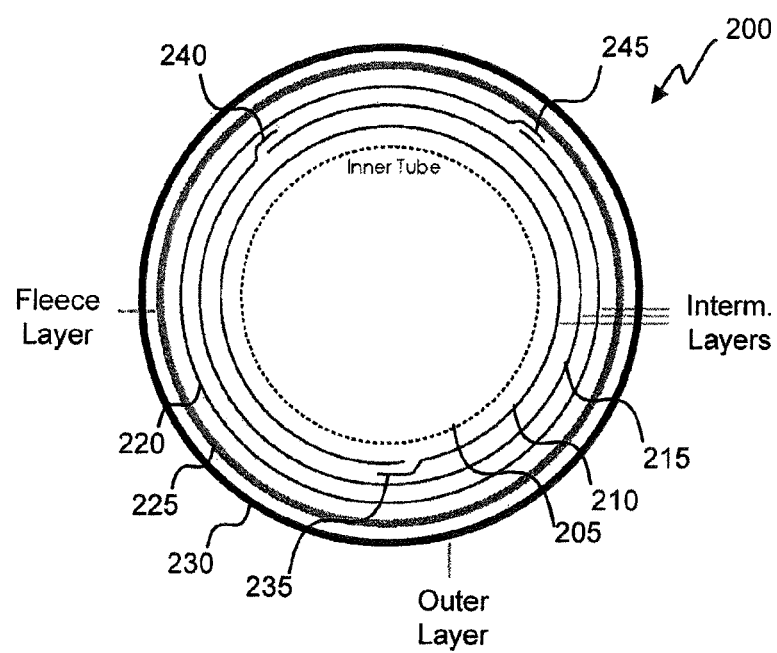

With reference to FIGS. 2A, 2B, and 2C, a liner tube 200 in accordance with the disclosure includes an inner layer 205, a first intermediate layer 210, a second intermediate layer 215, a third intermediate layer 220, a fleece layer 225, and an outer layer 230. In FIG. 2A, the first intermediate layer 210 is wrapped around the inner layer 205, while the other layers are shown in their normal flat state. In FIG. 2B, the liner tube 200 is shown in an uncured flat state. In FIG. 2C, the liner tube 200 is shown in a cured expanded state. The liner tube is shown with three intermediate layers, but other exemplary liner tubes could have two, four, five, six, seven, eight, nine, or more intermediate layers.

The inner layer 205 is impermeable to liquids to prevent resins from leaking out of the intermediate layers 210-220. The inner layer can be flexible tubing comprising synthetic material such as, for example, plastic, foil, silicone, polyester, Kevlar™, polyamide, rubber, and the like. The thickness of the inner layer 205 can be in a range from about 0.1 mm to about 1.0 mm depending on the type of material and the final diameter of the liner tube 200. The inner layer 205 can be a seamless tube (e.g., an extruded tube) or a seamed tube that has been taped, sewed, heat welded (e.g., melted), and the like. Seamless tubes do not exhibit perforations or imperfections that some of the other seamed tubes can exhibit. Perforations or imperfections can be susceptible to leakage. Seamless tubes that are available include those manufactured by Buergofol GmbH of Siegenburg Germany.

The intermediate layers 210-220 are porous materials capable of absorbing liquids such as curable resins. The intermediate layers 210-220 can include fiberglass, matting, polyester, fleece, Kevlar™, felt, polyamide, or combinations thereof. The intermediate layers 210-220 can include different materials and/or materials exhibiting different fibrous characteristics. For example one intermediate layer may have fibers that are mostly aligned in the axial direction parallel to the centerline of the liner tube 200 while another intermediate layer may include fibers that are mostly aligned circumferentially around the circular cross section of the liner tube 200.

The thicknesses of the intermediate layers 210-220 are typically about 0.8 mm when dry and about 1.0 mm when impregnated with resin. However, suitable intermediate layers 210-220 can have other thicknesses in a range from about 0.5 mm to about 1.2 mm. The thicknesses of the intermediate layers and/or the number of intermediate layers can be chosen to meet the strength requirements and desired dimensions of the finished liner tube.

The fleece layer 225 is a multilayer material that includes an inner absorbent sub-layer and an outer foil or plastic layer. The fleece layer 225 typically includes an inner absorbent sub-layer about 0.5 mm thick and an outer plastic layer ranging from about 0.1 mm to about 0.25 mm thick. The outer plastic sub-layer serves to strengthen the liner tube 200 and to prevent moisture from entering the inner layers. The inner absorbent sub-layer serves to absorb additional resin and to adhere the protective foil sub-layer to the intermediate layers 210-220. Commercially available fleece materials include those manufactured by Lantor GmbH of Haibach Germany.

The outer layer 230 is also impermeable to liquids so as to contain the resin within the intermediate layers 210-220 and the fleece layer 225. The outer layer 230 serves as a strengthening layer to resist damage when being installed in pipes. The outer layer 230 can be a plastic, foil, or other synthetic material. In some embodiments, the outer layer 230 is translucent. A translucent outer layer 230 enables inspection of the impregnated fleece layer 225, thereby permitting detection of any air pockets, tears, or other deficiencies in the impregnated intermediate layers. In some embodiments, the outer layer 230 is UV protective to prevent the resin from curing due to exposure to sunlight or any other light source. The outer layer is typically about 0.2 mm thick, but can be in a range from about 0.1 mm to about 0.5 mm. Commercially available outer layer materials include those manufactured by KPP Overseas GmbH.

The first intermediate layer 210 is wrapped around the inner layer 205 such that the intermediate layer 210 overlaps itself along a longitudinal edge to define a first overlap portion 235. The overlap portion 235 is on a lower portion of the liner tube 200. The second intermediate layer 215 is wrapped around the first intermediate layer 210 to define a second overlap portion 240 and the third intermediate layer 220 is wrapped around the second intermediate layer 215 to define a third overlap portion 245.

As best seen in FIG. 2B, the second and third overlap portions 240 and 245 are located on an upper surface of the liner tube 200, opposite the first overlap portion 235. By being located on opposite portions of the liner tube 200, there can be a reduced chance of leaks forming between the overlap sections compared to configurations where all the overlap sections are on the same side of the liner tube. In addition, by distributing the overlap sections around the perimeter of the liner tube, as best seen in FIG. 2C, the cured liner tube will experience a more even distribution of stresses.

The overlap portions can be of various widths, but are typically in a range of about 5% to about 20% of the total width of the layer being wrapped. For example, if the first intermediate layer 210 has a width of about 25.0 inches, then the width of the first overlap section 235 could be in a range from about 1.2 inches to about 4.0 inches. The size of the overlap can be increased for added strength or decreased to reduce expense.

In addition to the second and third overlap portions 240 and 245 being opposite the first overlap portion 235, they are also separated from each other circumferentially. In this illustration, viewed in cross-section of the expanded liner tube, the twelve o'clock position is meant to be at the top of the pipe upon installation. The second overlap portion 240 is located at about the ten o'clock position and the third overlap portion 245 is at about the two o'clock position.

By circumferentially separating the overlap portions and not allowing the overlap of one layer to be circumferentially aligned with the overlap in an adjacent layer, the wall strength of the liner tube 200 can be increased. Increases in strength are due in part to there being a more solid bond between adjacent intermediate layers, since each overlap creates a discontinuity in its associated intermediate layer, and circumferentially separated overlaps provide a continuous layer over one discontinuous overlap layer, as opposed to having two discontinuous overlap portions aligned circumferentially in adjacent layers. The mechanical characteristics of the liner tube can thereby be significantly increased, since each overlap location is covered by a continuous layer of material. In addition, separating the overlap portions can reduce the risk of damaging a liner tube when installing the liner tube in a pipe that is cracked or where portions of the pipe are missing. A liner tube could be more likely to suffer a blowout prior to curing if overlap portions are close together and located near a damaged or missing portion of pipe or at an intersection of an open lateral pipe.

With reference to FIG. 2A, a lateral offset 250 between the second and third intermediate layers 215 and 220 determines the distance between the second and third overlap portions 240 and 245. Similarly, relative lateral offsets (not shown) between the first intermediate layer 210 and the second and third intermediate layers 215 and 220 determines the clock distances between the first overlap portion 235 and the second and third overlap portions 240 and 245. For example, if the second intermediate layer is offset about ⅙ of the width of a layer (e.g., 4 inches for a 24-inch wide layer) to the right of the first intermediate layer 210, and the third intermediate layer 220 is displaced about ⅙ of the width of a layer to the left of the first intermediate layer 210, then the offset 250 would be about ⅓ a width of a layer, or about 8 inches. These displacements would result in the second overlap portion being rotated about sixty degrees (360 degrees divided by six) counter-clockwise to the ten o'clock position, and the third overlap portion would be rotated about sixty degrees clockwise to the two o'clock position. It should be understood that these values represent an approximation, as the exact rotation is affected by the width of the overlap portions, and by the thickness of the layers.

At the overlap portions, the overlapping edges of the corresponding intermediate layer can be free-floating (not bonded) or the edges can be secured together. Edges can be secured together by sewing, adhesives, tape, glue, or any combination thereof. Free-floating edges may allow for increased expansion capabilities in the radial direction during pressurization and installation.

The fleece layer 225 can be secured to itself along an overlapped longitudinal edge (not shown) using double-sided tape, glue, welding or melting, or using other adhesives. The outer layer 230 can be secured using similar methods. In embodiments where the intermediate layers are not woven, sewn, taped, or secured together by some other means, the secured edges of the fleece layer 225 are responsible for holding the other layers in place until the resin impregnates the intermediate layers 210-220. After the impregnation, the resin is the significant force holding the liner tube layers together.

There can be additional intermediate layers added to the liner tube 200. The additional intermediate layers can be positioned such that their respective overlap portions lie between the second and third overlap portions 240 and 245. Overlapping of overlap portions (e.g., two overlap portions at a similar clock angle, or circumferential location) can result in bulges in the resulting liner tube. In contrast, non-overlapping (i.e., circumferentially separated) overlap portions can result in a smoother liner tube exterior. Bulges in the exterior of a liner tube could result in an increased risk of cracks, leaks, or other flaws being induced during or after the installation of the liner tube.

After installing a number of intermediate layers, six or more, for example, or after all the clock positions between ten o'clock and two o'clock, and/or between four o'clock and eight o'clock, are occupied, the overlap portions of additional layers can overlap lower overlap portions. By positioning an overlap portion of an additional intermediate layer to overlap the overlap of the deepest intermediate layer, the risk of damage can be minimized. For example, since the second overlap portion 240 is the deepest overlap portion on the upper side of the liner tube 200, this would be the first overlap portion to be overlapped when all the space between the ten o'clock and two o'clock circumferential range is occupied by other overlap portions.

Figure 3A:
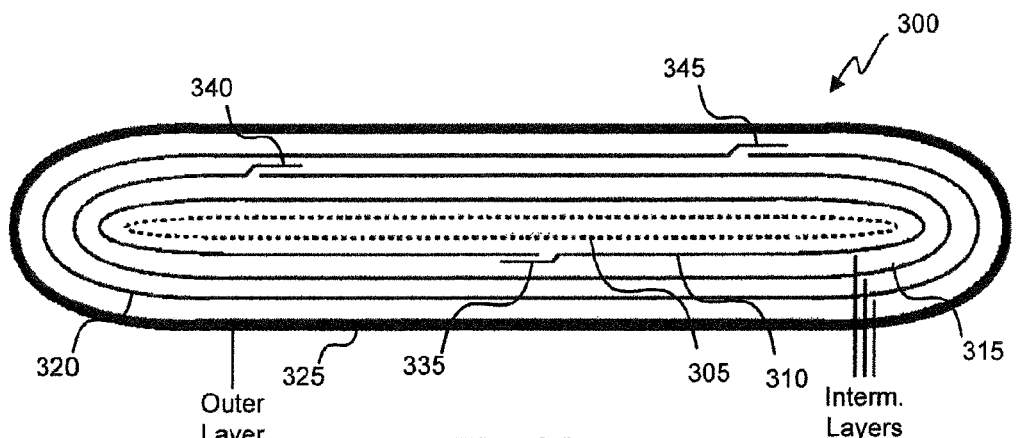
FIGS. 3A and 3B show cross sections of another example of a liner tube in an uninstalled flat state and in an expanded state, respectively.
Figure 3B:
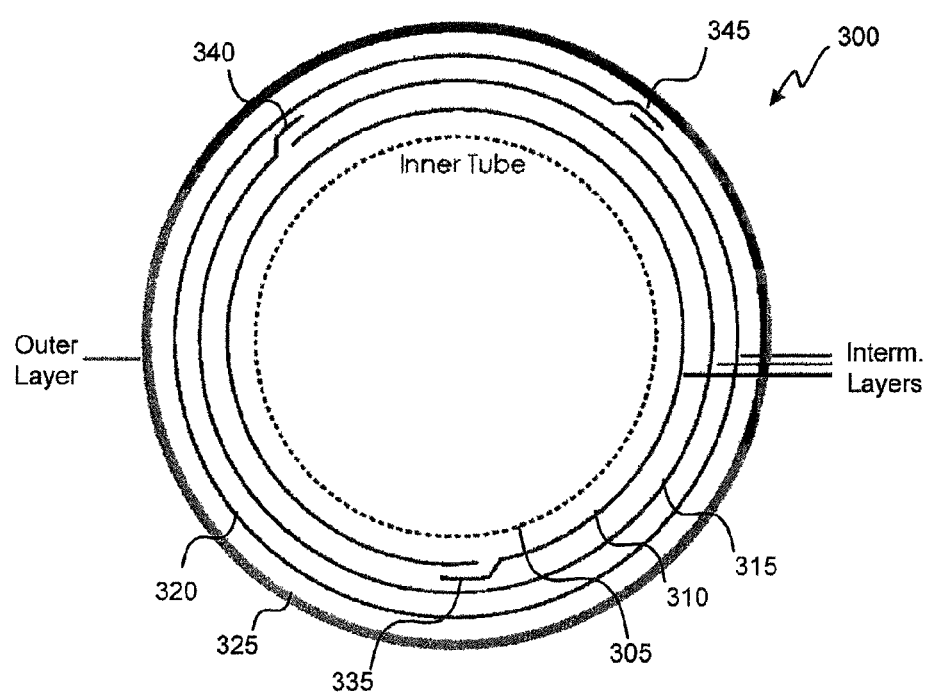
Figure 3C:
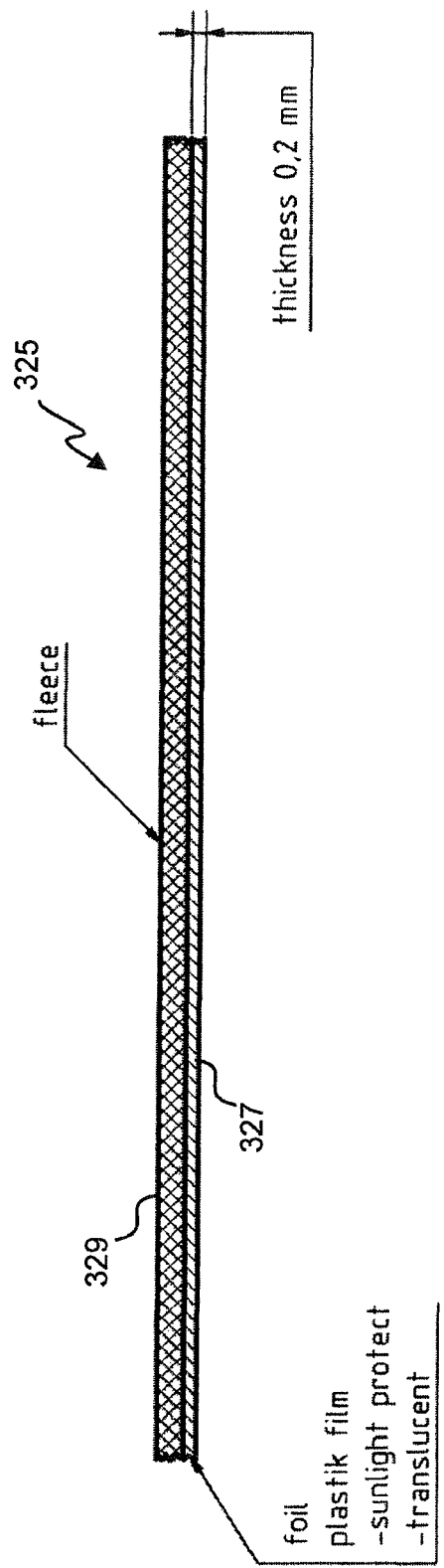
FIG. 3C shows a cross section of a single outer fleece layer used in the liner tube of FIGS. 3A and 3B.

With reference to FIGS. 3A, 3B, and 3C, another exemplary liner tube 300 includes an inner layer 305, first, second, and third intermediate layers 310, 315, and 320, respectively, and an outer fleece layer 330. The inner layer 300 and the intermediate layers 310-320 are similar to the inner layer 205 and intermediate layers 210-220, respectively, of the liner tube 200 of FIG. 2. In addition, the overlap portions 335, 340, and 345 are similar to respective overlap portions 235, 240, and 245.

The liner tube 300 of FIGS. 3A, 3B, 3C differs from the liner tube 200 of FIGS. 2A, 2B by having the single outer fleece layer 325 instead of the separate fleece 225 and the outer layer 230. The outer fleece layer 325 includes an inner fleece sub-layer 329 and an outer plastic sub-layer 327 (see FIG. 3C). The outer fleece layer 325 is similar to the fleece layer 225 except it has a thicker outer plastic sub-layer 327 (see FIG. 3C) as compared with the fleece layer 225. This outer plastic sub-layer 327 can be on the order of 0.2 mm thick or more. The single outer fleece layer 325 performs similar functions to those of the fleece layer 225 and outer layer 230. Having one layer to replace two layers can simplify the manufacturing process and reduce costs in some cases.

Figure 4A:
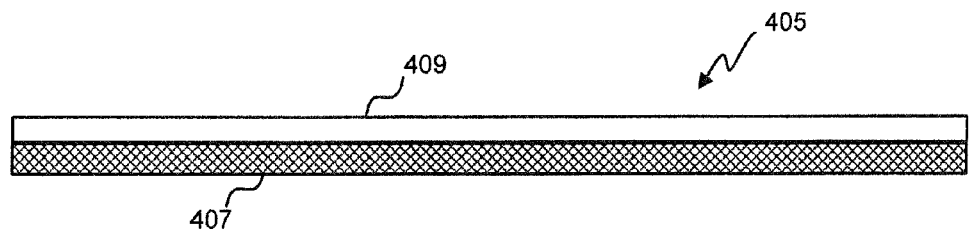
FIGS. 4A and 4B show cross sections of an example of an inner layer in a planar state and in a folded state, respectively, where the inner layer includes a silicone layer.
Figure 4B:
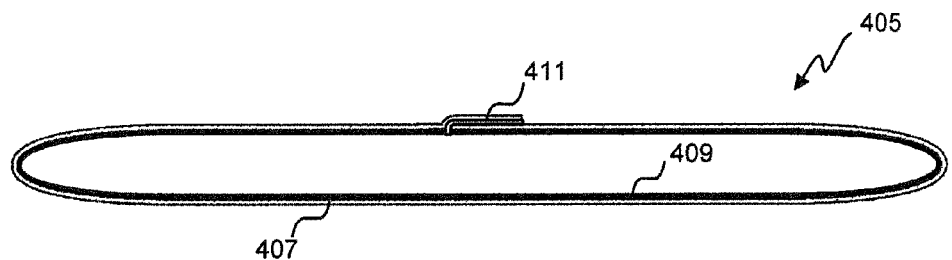
Figure 4C:
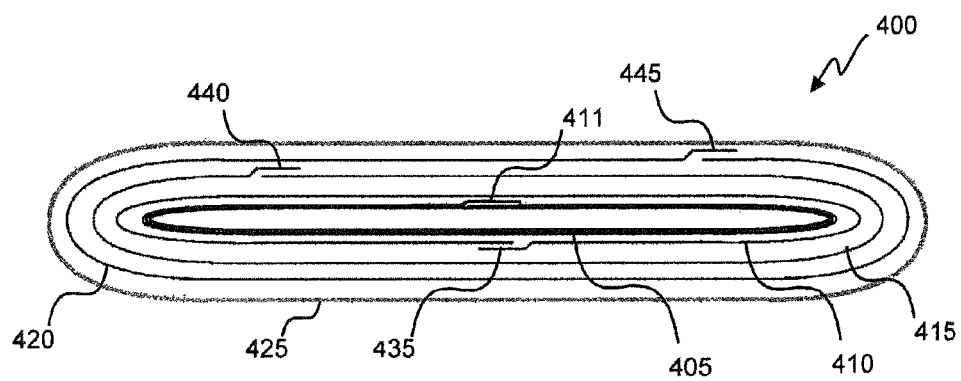
FIG. 4C shows a cross section of an example of a liner tube including the inner layer of FIGS. 4A and 4B.

With reference to FIGS. 4A, 4B, and 4C, another exemplary liner tube 400 includes a silicone coated inner layer 405, intermediate layers 410, 415, and 420 and a single outer fleece layer 425. The intermediate layers 410, 415, and 420 are similar to the intermediate layers 210-220 and 310-320 of the liner tubes 200 and 300, respectively. The single outer fleece layer 425 is similar to the single outer fleece layer 325. The liner tube 400 differs from the liner tubes 200 and 300 with respect to the silicone coated inner layer 405.

FIG. 4A shows the silicone inner layer 405 in an unfolded non-tubular state. The silicone inner layer includes an absorbent outer sub-layer 407 and a silicone coating sub-layer 409. The silicone coating 409 adheres to the fleece sub-layer 407. Suitable materials for the absorbent outer sub-layer 407 include fiberglass, Kevlar™, polyamide fibers, felt, fleece, and the like.

FIG. 4B shows the silicone inner layer 405 formed into a tubular configuration. In this example, longitudinal edges of the silicone coated inner layer 405 are secured by an adhesive 410 such as silicone glue. The silicone glue is treated using known methods including heat to form a secure seal. The inner silicone coating sub-layer 409 is impermeable to the resin and serves a similar function to the inner layers 205 and 305 in the liner tubes 200 and 300.

Silicone is very heat resistant, flexible, and mechanically strong. Thus, it is suitable as a coating 409 on the inner surface of the sub-layer 407 to form the inner layer 405. In addition, the silicone coating 409 does not have to be removed from the tube liner 400 after being cured. Other plastic inner layers are typically removed after application because they are sometimes become bonded to the other layers in patches and can shed and form debris that could clog the pipe. Removal of the inner layer can be a difficult and time consuming task if portions of the inner layer become bonded to the other layers. Even if the plastic inner layers can be cleanly removed, they can still present a collection and disposal problem at the job site. Thus, the strength and durability of the liner tube 400 as a whole can be increased or intermediate layers can be reduced in thickness or even removed, while at the same time reducing costs and saving time.

Figure 10:
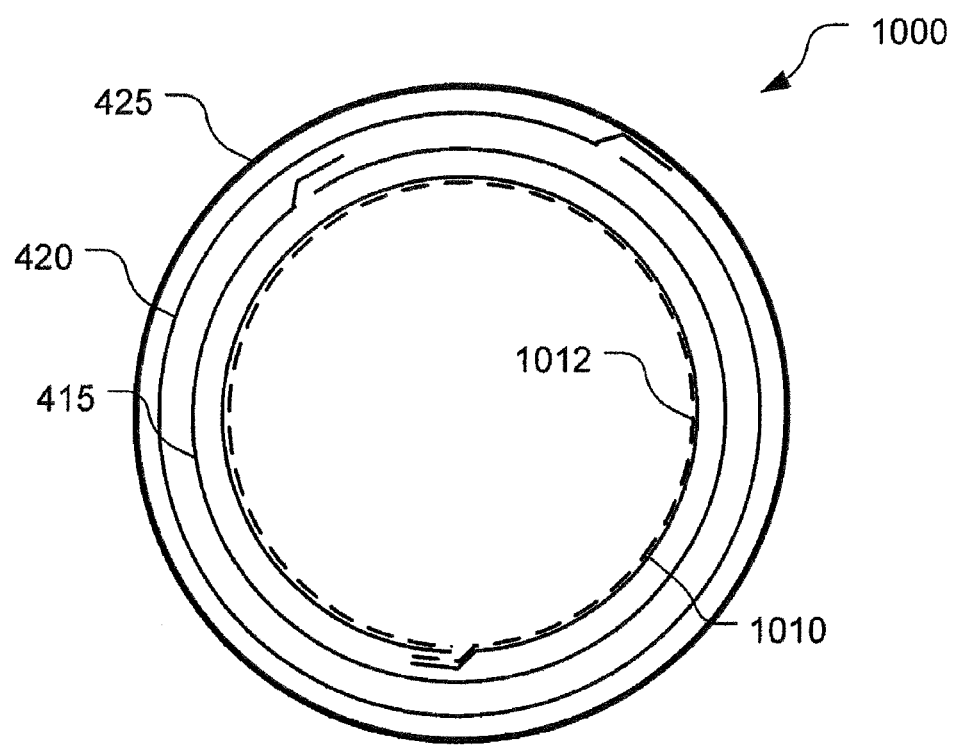
FIG. 10 shows a cross section of an example of an expanded liner tube with an innermost absorbent layer provided with a coating that replaces an independent inner layer.

As an alternative to coating an inner surface of the absorbent sub-layer 407 with a coating 409 to form the inner layer 405, an inner surface of the innermost intermediate layer (i.e., the first intermediate layer 410) can be coated with an impermeable coating, and the separate inner layer 405 could be omitted. With reference to FIG. 10, a cross section of a liner tube 1000 includes a first intermediate layer 1010 that is coated on an inner surface with a coating 1012. The remaining layers are the same as those in the liner tube 400 of FIGS. 4A, 4B, and 4C. The coating 1012 on the inner surface of the innermost intermediate layer is impermeable to resin that is impregnated into the intermediate layers and is also impermeable to liquid or gas that will flow through the pipe in which the liner tube 1000 will be installed. The inner coating 1012 can be silicone or some other suitable coating.

With reference to FIGS. 5A-5G, a folding apparatus 500 for assembling a liner tube includes a frame 501, a plurality of rotation members 502, where each rotation member supports a spool of material for assembling the liner tube. The spools include a first spool 504 wound with a first absorbent material for the first intermediate layer, a second spool 506 wound with a second absorbent material for the second intermediate layer, a third spool 508 wound with a third absorbent material for the third intermediate layer, a flexible tubing spool 510, and an outer layer material spool 512.

Figure 5A:
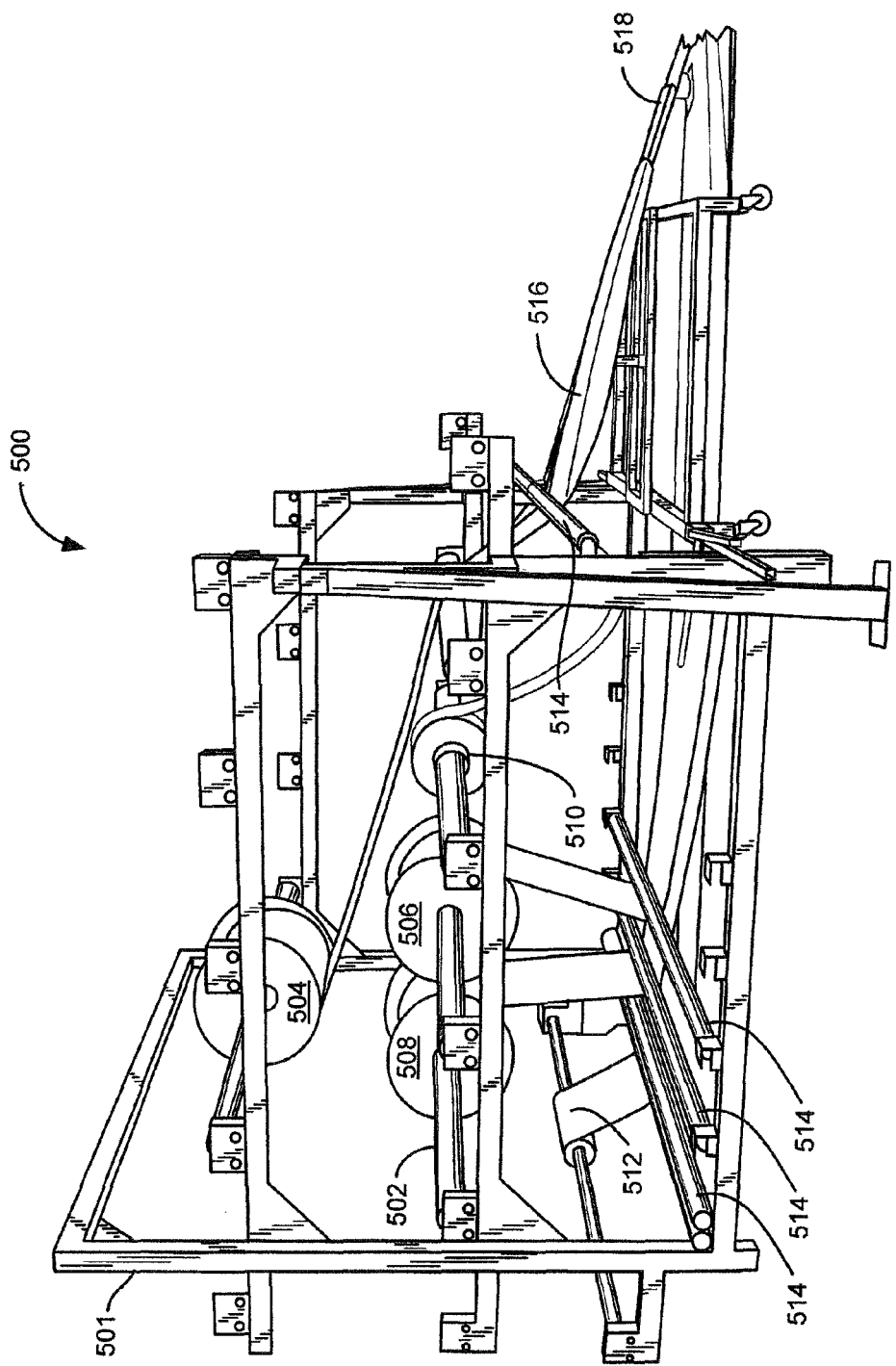
FIGS. 5A-5G show various views of an example of a folding apparatus used for folding various layers of a liner tube. Specifically.
Figure 5B:
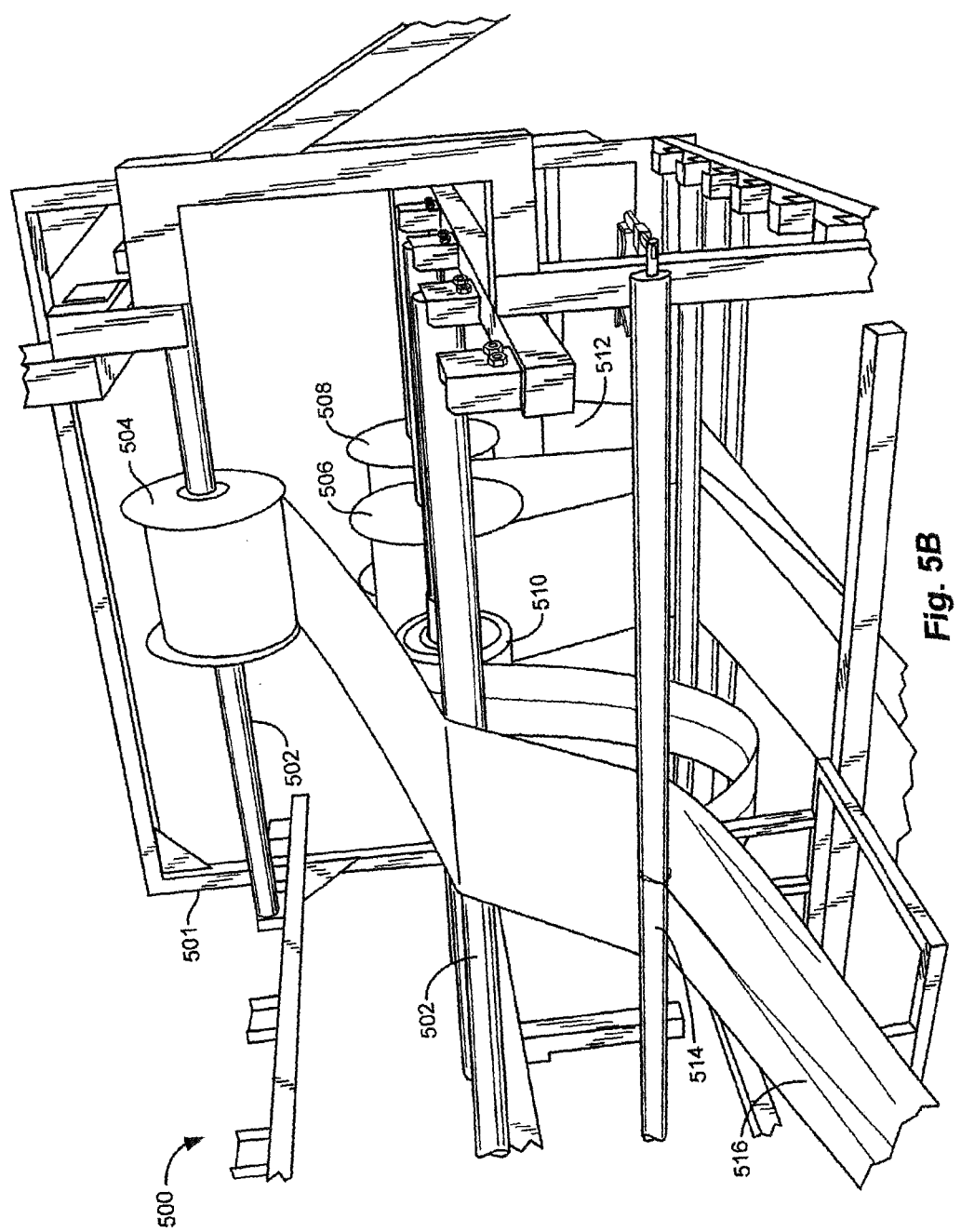
Figure 5C:
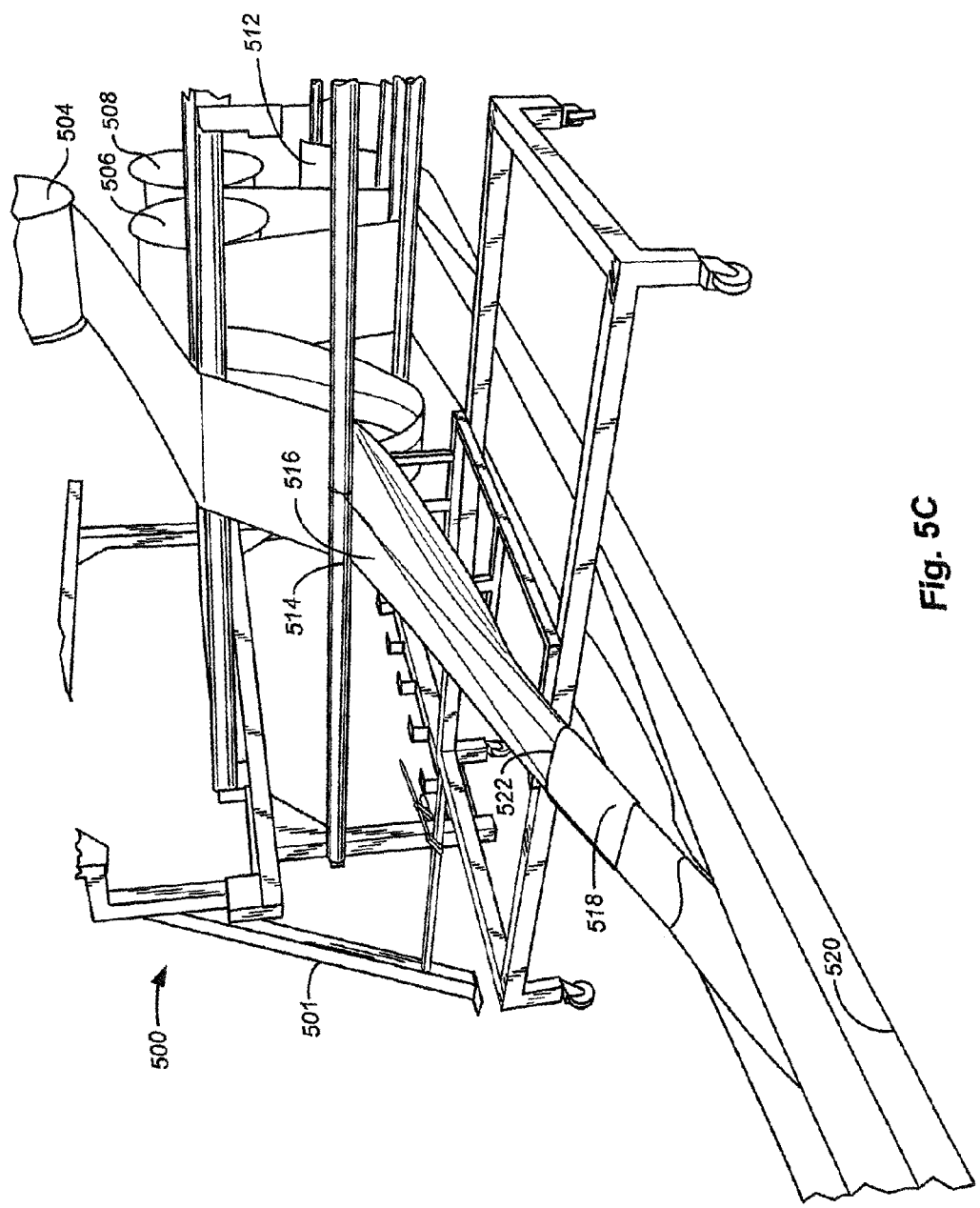
Figure 5D:
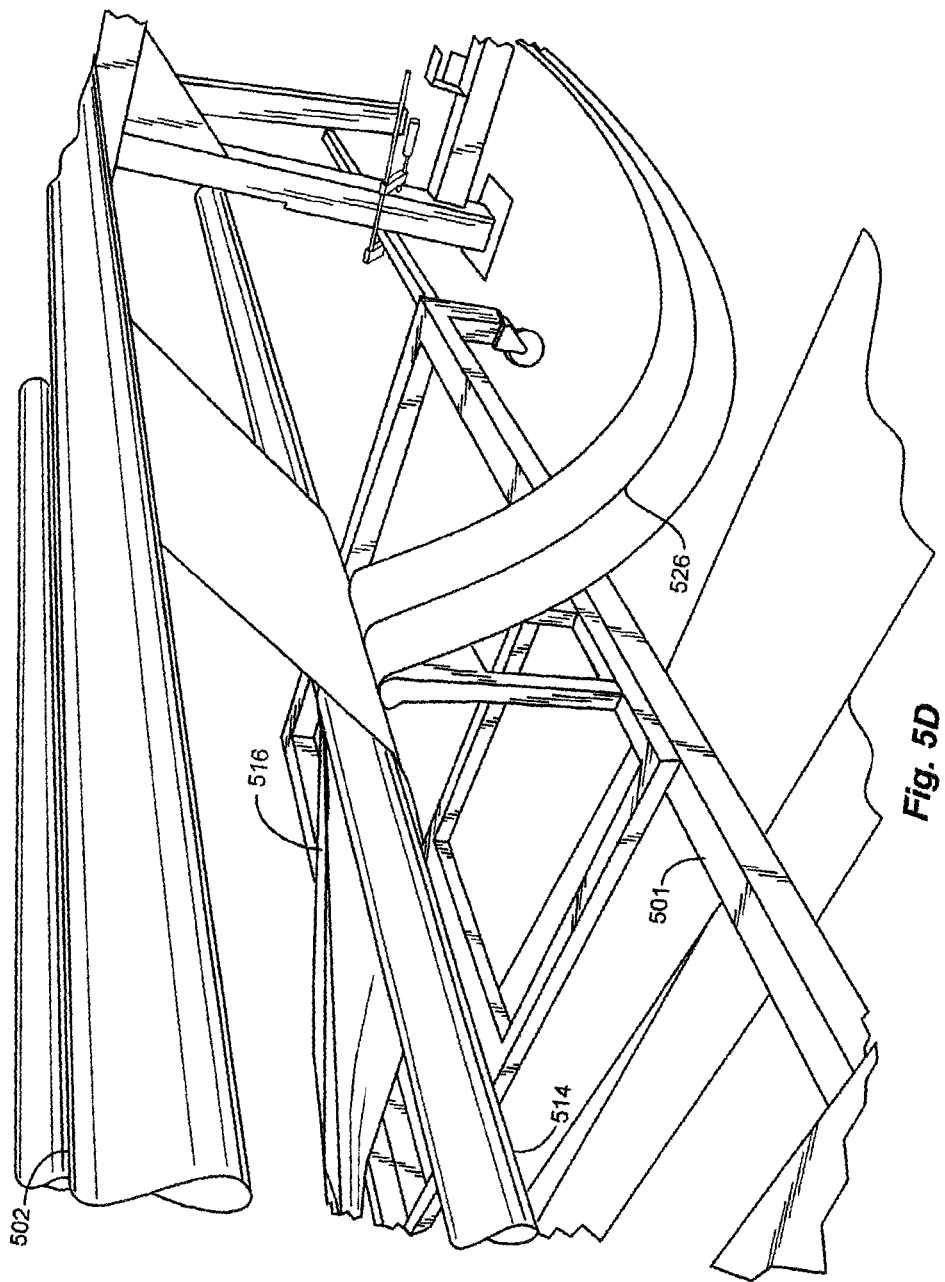
Figure 5E:
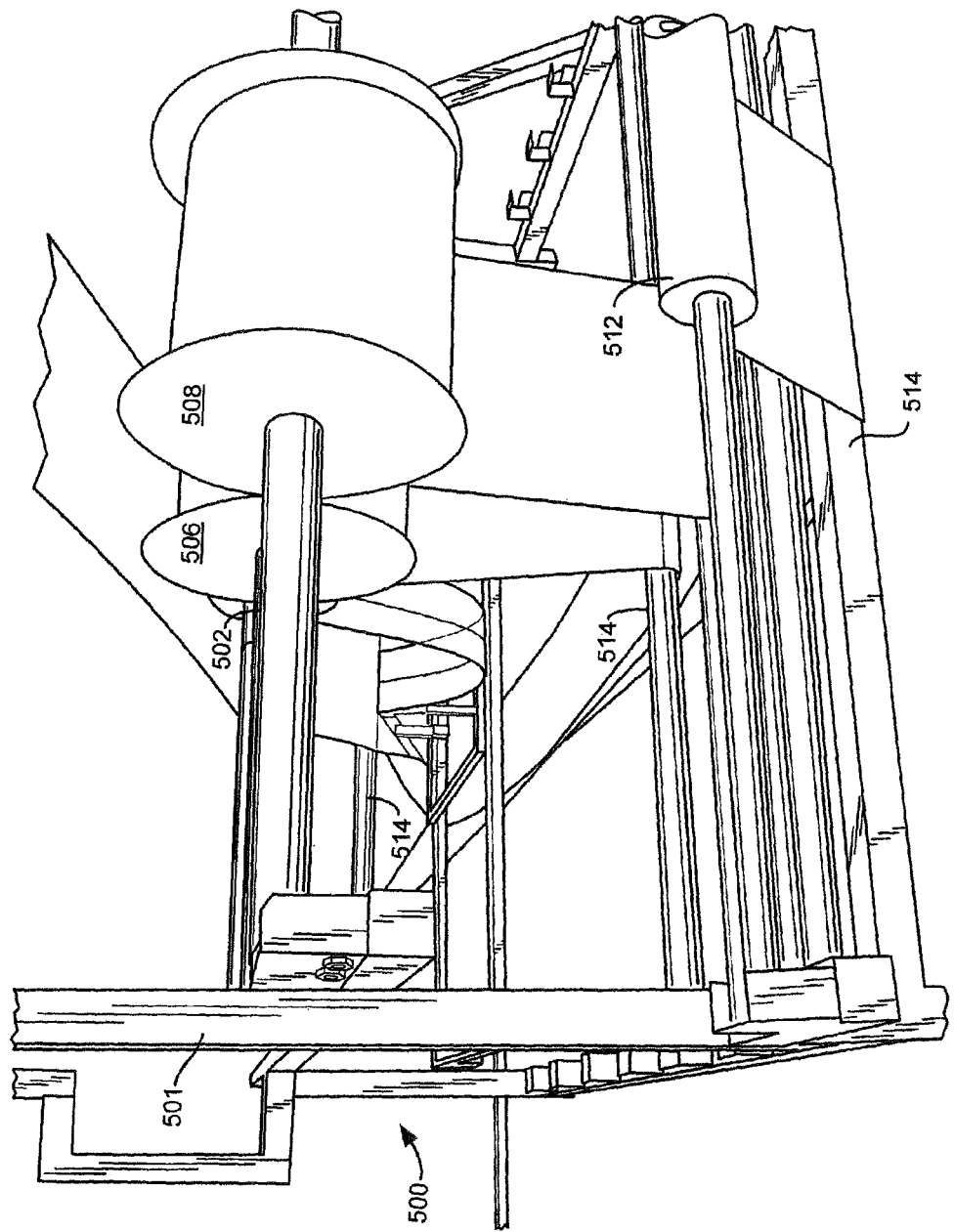

The material from each of the spools 504-512 passes by one of a plurality of transition members 514. The transition members 514 guide the different material layers toward one of two receiver platforms for mating the layers together. As best illustrated in FIGS. 5C and 5D, the first absorbent material from the first spool 504 and the flexible tubing inner layer material from the tubing spool 510 are mated at a first receiver platform 516 with the flexible tubing being under the first absorbent material. The first receiver platform 516 is about as wide as the flexible tubing and is aligned with the tubing spool 510. In this example, the first receiver platform 516 is aligned with the center of the first spool 504 containing the first absorbent material.

A folder mechanism 518 is coupled to the first receiver platform and is configured to fold the first absorbent material around the flexible tubing such that the first absorbent material overlaps with itself along a longitudinal edge to define a first overlap portion on a first surface of the flexible tubing. When the first absorbent material is wrapped around the flexible tubing, the first overlap portion will be defined at the six o'clock position as discussed above in reference to the liner tubes 200, 300 and 400 shown in FIGS. 2-4.

In the folding apparatus 500, the first receiver platform 516 extends through the folder mechanism 518 such that the flexible tubing and the first absorbent material are guided along the first receiver platform and are held in a folded configuration. To first feed the flexible tubing and the first absorbent material into the folder mechanism 518, the folder mechanism is opened and removed from the first receiver platform 516. The flexible tubing and the first absorbent material are then folded around the receiver platform in correct alignment, and then the folder mechanism is re-attached to the first receiver platform 516. Front edges 522 of the folder mechanism 518 are contoured and smoothed so as to guide the first absorbent material into the folding mechanism 516 without catching. Upon being fed into the folder mechanism 518, the folded absorbent material and flexible tubing can be pulled through in order to unwind material from the first spool 504 and the tubing spool 510 and be folded in a properly aligned fashion.

Figure 5F:
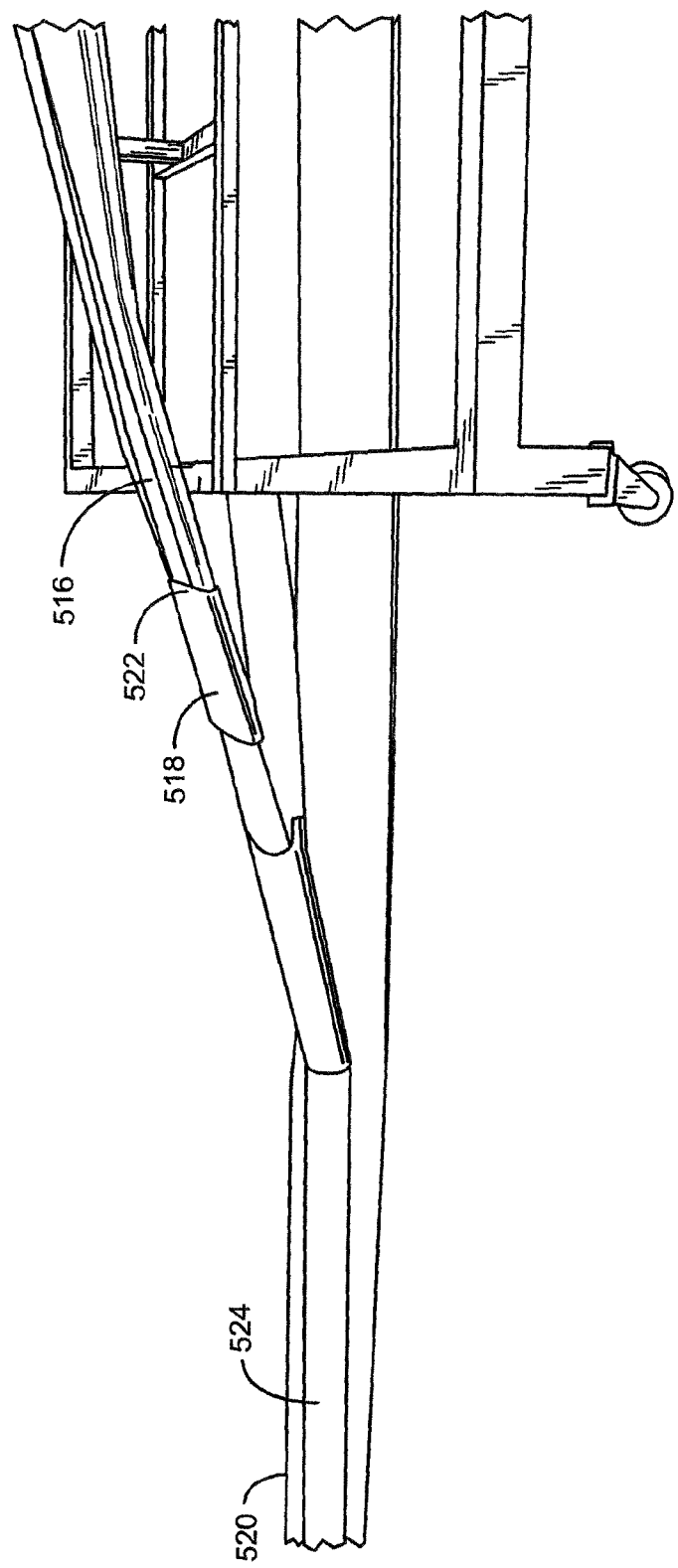
Figure 5G:
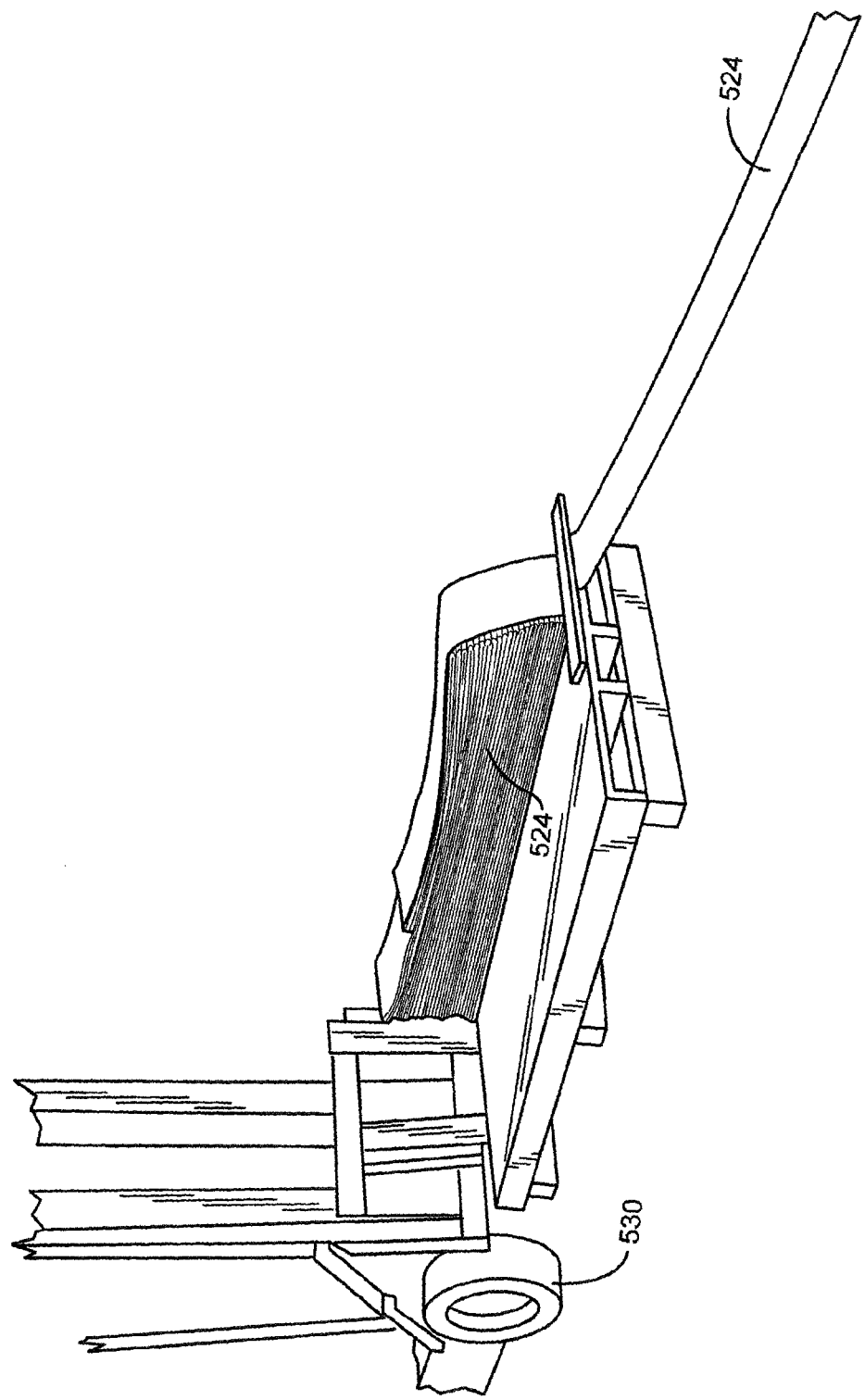

Upon exiting the folder mechanism 518, the folded first absorbent material and flexible tubing are mated, at a second receiver platform 520, with the second absorbent material from the second spool 506, the third absorbent material from the third spool 508, and the material from the outer layer spool 512, in that order from top to bottom, as shown best in FIG. 5F. The second spool 506 and the third spool 508 can be moved on respective rotation members 502 such that they are offset from each other, and from the first spool 504, to position the second and third overlap portions relative to the first overlap portion formed at the six o'clock position. Thus, the spools are positioned on the apparatus 500 with lateral offsets from each other in accordance with their desired circumferential separation in the inflated liner tube.

The weight of the first absorbent material is sufficient to hold itself in place, when folded, and not unwrap while being drawn out of the folder mechanism 518 and mated on top of the other materials on the second receiver platform 520. When a sufficient length of material has been pulled out of the folder mechanism 518 and unwound from the spools 502-512, the second absorbent material is wrapped around the first absorbent material to overlap itself and define a second overlap portion. The third absorbent layer is wrapped around the second absorbent material to overlap itself to define a third overlap portion and, lastly, the outer layer material is wrapped around the third absorbent material to surround the inner layers.

The outer layer material includes a strip of double sided tape, or other adhesive, that is used to secure one longitudinal edge of the outer layer to the other longitudinal edge. A folded liner tube 524 can be seen in FIG. 5F. The folded liner tube 524 is strong enough to be used to pull other material from the spools 504-512 to be received on the first and second receiver platforms 518 and 520 and be fed through the folder mechanism 518. The folder apparatus 500 employs a conveyance device 530 (see FIG. 5G) to pull the other materials from the spools 504-512. Other embodiments could use other means of conveyance such as, for example, a conveyor belt.

Figure 6A:
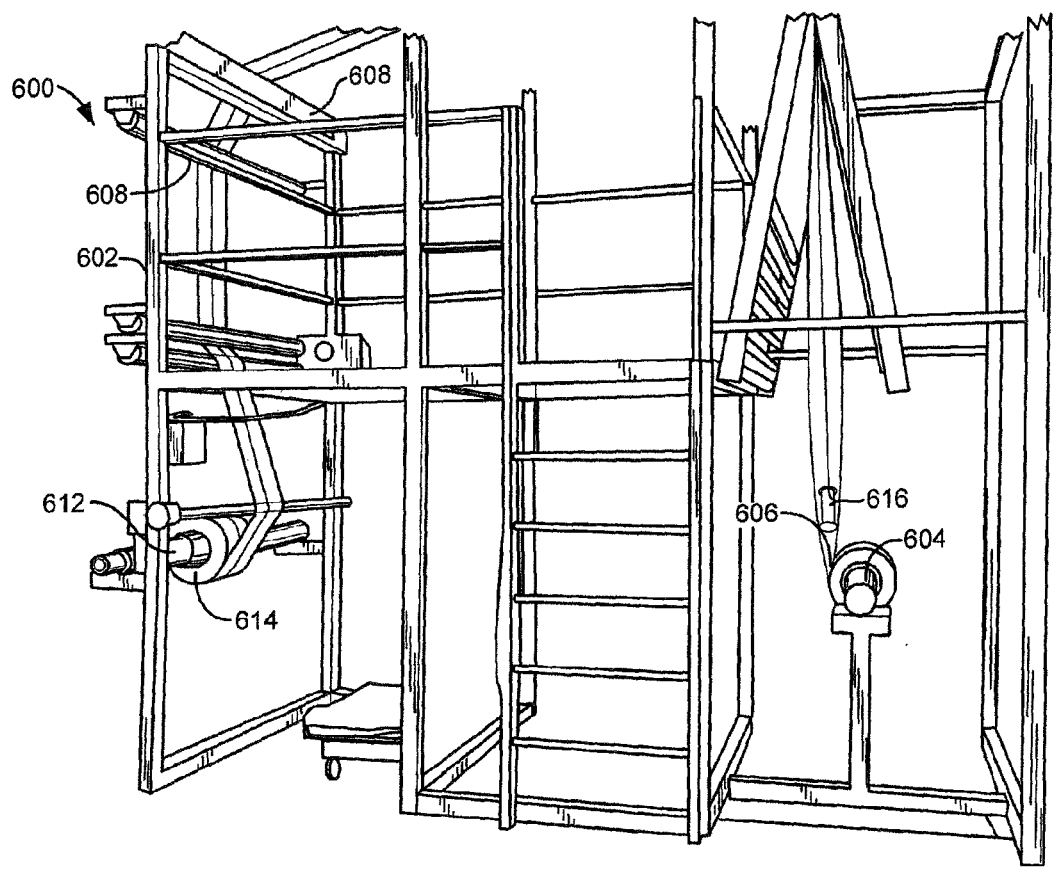
FIG. 6A shows a side view of an example of an apparatus for inserting a line within flexible tubing used in a tube liner, where the flexible tubing is wound on a spool.
Figure 6B:
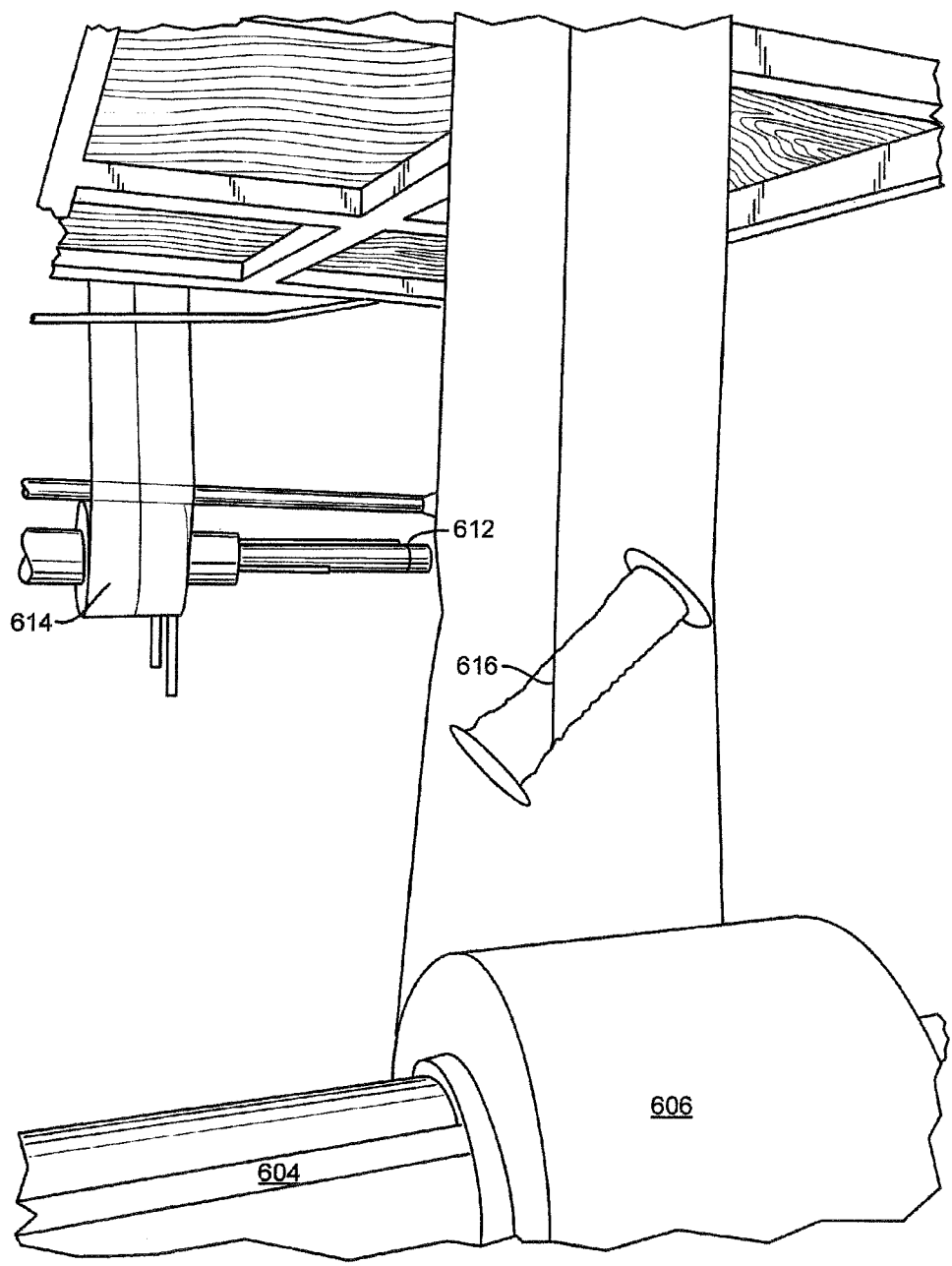
FIG. 6B shows a view of a spool of line being inserted in the inner flexible tubing using the apparatus of FIG. 6A.
Figure 7:
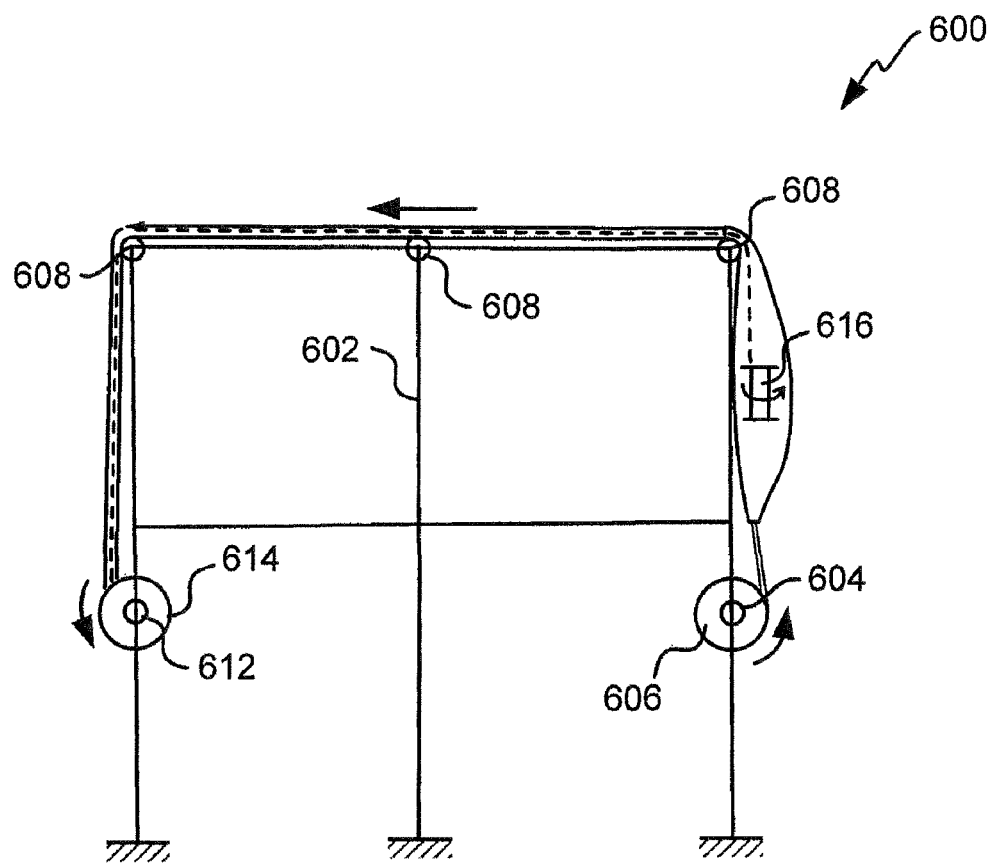
FIG. 7 is a simplified schematic diagram of the apparatus of FIGS. 6A and 6B.

As discussed above, the inner flexible tube layer sometimes is threaded with a line. This is illustrated in FIG. 5D, where a line 526 is contained within the flexible tube being unwound from the spool 510. An example of a stringer apparatus 600 for inserting a line in a spool of wound flexible tubing is shown in FIGS. 6A and 6B. FIG. 7 shows a simplified schematic diagram of the stringer apparatus 600. With reference to FIGS. 6A, 6B and 7, the stringer apparatus 600 includes a frame 602, a first rotation member 604, transition members 608 and a second rotation member 612.

A first spool 606 is supported on the first rotation member 604. The first spool 606 is wound with unthreaded flexible tubing. A portion of the flexible tubing is unwound from the first spool 606 and a line spool 616 (see FIG. 6B) is inserted into the flexible tubing. The line and the flexible tubing are then strung over the transition members 608 and wound onto a second spool 614 supported on the second rotation member 612. The second spool 614 is then rotated to wind the flexible tubing and line around the second spool and unwind the flexible tubing from the first spool 606 while the line unwinds from the line spool 616. In this way, an entire spool of flexible tubing can be threaded with an interior line.

Figure 8A:
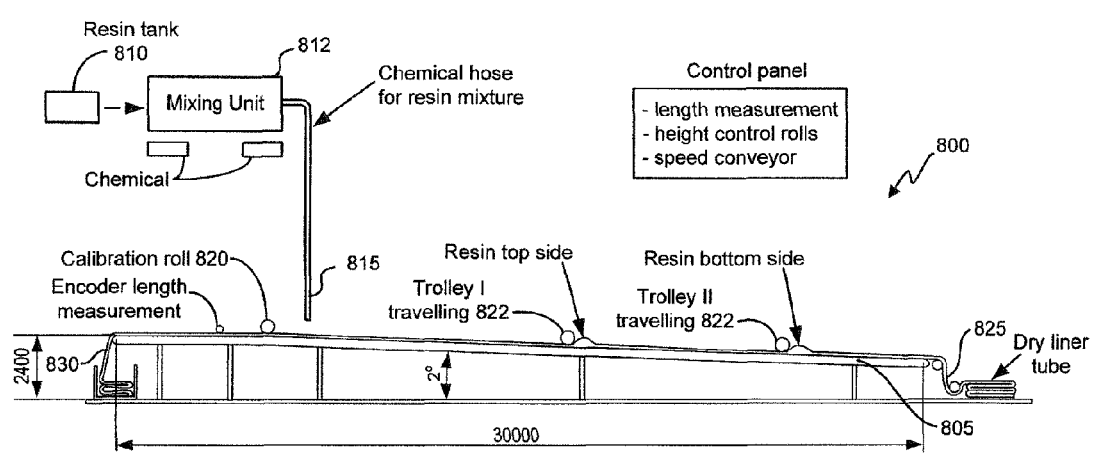
FIG. 8A shows a side view of an example of an inclined conveyor belt system used for impregnating a liner tube with a curable resin.
Figure 8B:
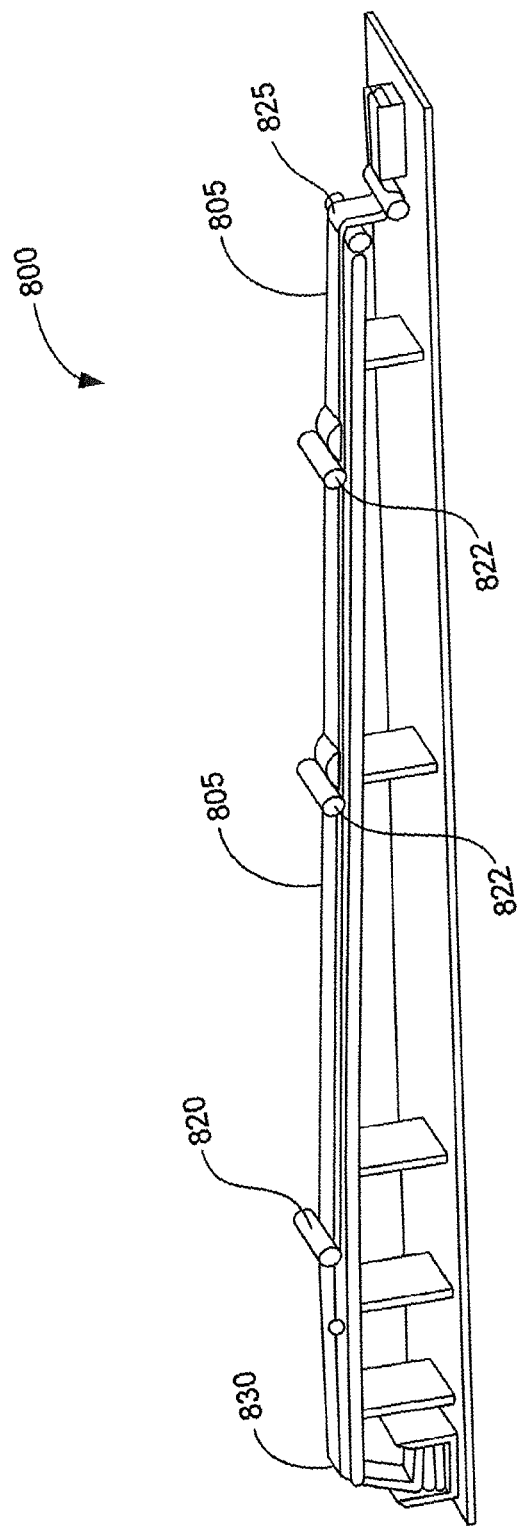
FIG. 8B shows a perspective view of the inclined conveyor belt system of FIG. 8A.

With reference to FIGS. 8A and 8B, an impregnator system 800 includes an inclined conveyor belt 805, a liquid source 810, a mixing unit 812, an applicator 815, a calibration roller 820, and a plurality of traveling rollers 822. The inclined conveyor belt 805 has a low end 825 and an elevated end 830. The conveyor belt 805 is configured to receive a liner tube at the low end 825 and carry the liner tube toward the elevated end 830. The system 800 receives operator input through a control panel 832. The control panel provides control signals to control system parameters such as speed of the conveyor belt 805, operation of the mixing unit 812 and the applicator 815, travel of the rollers 820, 822, and the like.

As discussed above, the liner tube is a substantially flat flexible tube comprising an outer layer, an inner layer, and a plurality of intermediate layers, the intermediate layers comprising absorbent material. The applicator 815 is coupled to the liquid source 810. The liquid source 810 contains a curable liquid, such as resin. The mixing unit 812 mixes the raw resin with other chemicals. For example, the resin can be mixed with magnesium oxide that thickens the resin mixture sometime after the impregnation process has been completed to become more viscous such that the resin remains in place and does not redistribute. The applicator 815 is configured to drive the resin through apertures formed in the outer layer. The apertures can be created by manually or automatically cutting through the outer layer. The applicator 815 then drives the resin through the aperture and into the intermediate layers to impregnate the absorbent material.

Upon being impregnated with the resin, the traveling rollers 822 travel along the length of liner tube that is on the conveyor belt. The traveling rollers 822 start near the elevated end 830 of the inclined conveyor belt 805, where the applicator 815 impregnated the liner tube with the resin. After the traveling rollers 822 have distributed the resin along the length of the inclined conveyor belt 805, the liner tube is propelled from the low end 825 to the elevated end 830 to be compressed by the fixed calibration roll 820. Several apertures may be needed to impregnate the entire length of liner tube.

The conveyor belt 805 can be inclined at an angle typically greater than about one degree so as to be sufficient to assist in spreading the resin in the intermediate layers during impregnation, because the resin will tend to flow down the incline. The inclination can be larger for thicker resins and smaller for thinner resins. The travelling rollers 822 and the fixed calibration roller 820 are adjustable and can be adjusted to compress the liner tube to a desired thickness. The travelling rollers 822 and/or the fixed calibration roller 820 can include motors for driving the rollers. The final thickness of the liner tube, as determined by the height of the fixed calibration roller 820, will determine how much resin is retained in the absorbent material of the intermediate layers. The amount of resin remaining will determine the strength of the liner tube after being cured. The speed of the conveyor belt 805 is adjustable from about zero meters per minute to about 20 meters per minute.

The speed of the inclined conveyor belt 805 can be varied to propel different configurations of liner tube at different speeds to prevent the conveyor belt and/or rollers 820 and 822 from slipping relative to the liner tube, which could cause the movement of the liner tube to be arrested, and to prevent the liner tube from folding and collecting on the rollers. The inclined conveyor belt 805 can be a single continuous belt or can be comprised of two or more independent belt segments. For a segmented belt 805, the speed of the individual belt segments can be varied independently in order to propel the liner tube at different rates, if desired, and to provide variable pulling power on the liner tube with the different conveyor belt segments.

Figure 9A:
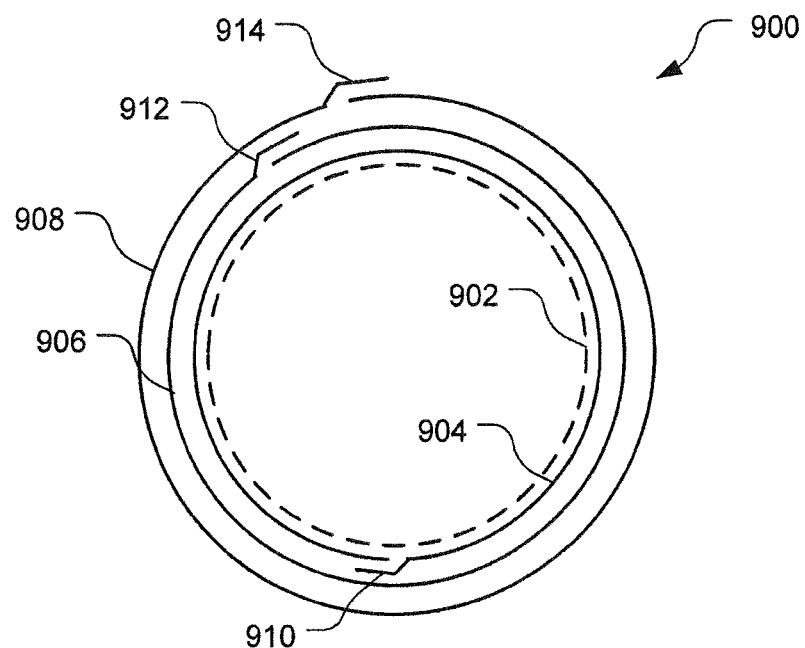
FIGS. 9A and 9B show cross sections of examples of expanded liner tubes with overlap portions located at different angular locations relative to each other.

As discussed above, the strength and durability of a liner tube can be increased if overlap portions in adjacent layers do not align circumferentially, and are separated by relatively large angular distances. With reference to FIG. 9A, a liner tube 900 shown in the expanded state includes inner tubing 902, a first intermediate layer 904, a second intermediate layer 906, and a third intermediate layer 908. The first intermediate layer has a first overlap portion 910 at about the six o'clock position in FIG. 9A. The strength and durability of the liner tube 900 can be improved by configuring a second overlap portion 912 in the second intermediate layer with a circumferential spacing from the first overlap 910 of at least 120 degrees. Thus, as illustrated in FIG. 9A, the second overlap portion 912 is located at an angular position at least 120 degrees apart from the first overlap portion 910.

Further intermediate layers can be separated by less than 120 degrees from overlap portions in adjacent layers, so long as no two adjacent intermediate layers have overlap portions that align circumferentially. This reduced separation is possible in part because, as extra layers are added, the liner tube is not as susceptible to damage when being installed and is not as susceptible to damage, such as blowouts, during deployment and prior to curing. However, if overlap portions of two adjacent layers are located so they do align circumferentially, then the liner tube could bulge in these locations and be susceptible to uneven resin distribution and can result in uneven curing, where the bulges could remain uncured after installation. In addition, bulges may prevent the liner tube from seating properly against a pipe. In view of such considerations, a third overlap portion 914 is positioned less than 120 degrees from the overlap portion 912 of the adjacent second intermediate layer, but the third overlap portion 914 does not align circumferentially with any of the second overlap portion 912. To avoid circumferential alignment, overlap portions of adjacent layers should be located so that no portion of the double thickness of intermediate layer formed by an overlap portion in one layer is adjacent any portion of the double thickness of intermediate layer formed by the overlap portion in the adjacent layer.

Figure 9B:
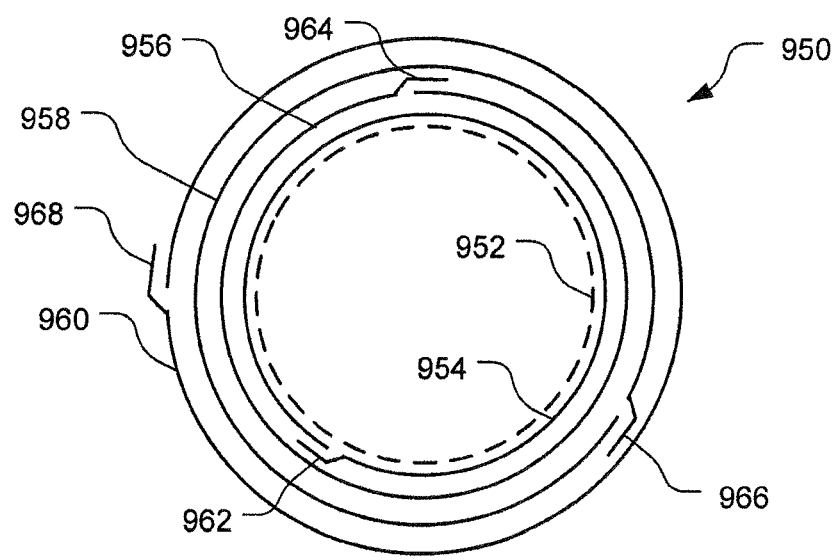

With reference to FIG. 9B, a liner tube 950 includes an inner tubing 952, a first intermediate layer 954, a second intermediate layer 956, and a third intermediate layer 958. The first intermediate layer 954 has a first overlap portion 962 at about the seven o'clock circumferential position. The second, third, and fourth intermediate layers 956, 958, and 960 include second, third, and fourth overlap portions 964, 966 and 968, respectively. In order to further improve the strength and durability of the liner tube 950, each of the second, third, and fourth overlap portions 964, 966, and 968 is positioned at an angular position displaced circumferentially at least 120 degrees from the overlap portions of the adjacent layers. Positioning the overlap portions 964, 966, and 968 in such a manner can provide both increased strength and more uniform thickness.

While the principles of the disclosure have been described above in connection with specific apparatuses and methods, it is to be clearly understood that this description is made only by way of example and not as limitation on the scope of the disclosure.

What is claimed is:

1. A method of making a liner tube having sufficient flexibility to lie substantially flat in a first state and to be substantially circular in cross section in an expanded state, the method comprising:
    wrapping a first intermediate layer around a flexible tube, the first intermediate layer overlapping itself to define a first overlap portion at a first circumferential position of the circular cross section when the liner tube is in the expanded state;
    wrapping a second intermediate layer around the first intermediate layer, the second intermediate layer overlapping itself to form a second overlap portion at a second circumferential position of the circular cross section when the liner tube is in the expanded state, the first circumferential position and the second circumferential position being at least 120 degrees apart circumferentially,
    wrapping a third intermediate layer around the second intermediate layer, the third intermediate layer, the third intermediate layer overlapping itself to form a third overlap portion, wherein the second overlap portion and the third overlap portion do not overlap each other and
    wrapping an outer layer around and adjacent to the third intermediate layer to surround the first and, second and third intermediate layers between the outer layer and the flexible tube; and
    at least the first and second intermediate layers comprising an absorbent material and the flexible tube comprising a substantially impermeable material;
wherein the flexible tube comprises an absorbent layer with a silicone coating formed on an inner surface of the flexible tube, wherein the absorbent material layer is adjacent to the first intermediate layer.

2. The method of claim 1, wherein longitudinal edges of the silicone coated flexible tube are secured with silicone glue, wherein the longitudinal edges are oriented along the length of the flexible tube.

3. The method of claim 1, further comprising impregnating the first and second intermediate layers with a curable liquid.

4. The method of claim 1, wherein at least one of the first and second overlap portions are free-floating and impermeable to gases and liquids such that the liner is gas/liquid tight in response to curing.

5. The method of claim 1, wherein the outer layer is translucent to visible light and impermeable to light in at least a portion of the ultraviolet spectrum.

* * * * *